May 21, 1929.  D. M. SHELDON  1,713,927
METHOD OF AND APPARATUS FOR MAKING TIRES
Filed March 12, 1926  7 Sheets-Sheet 3
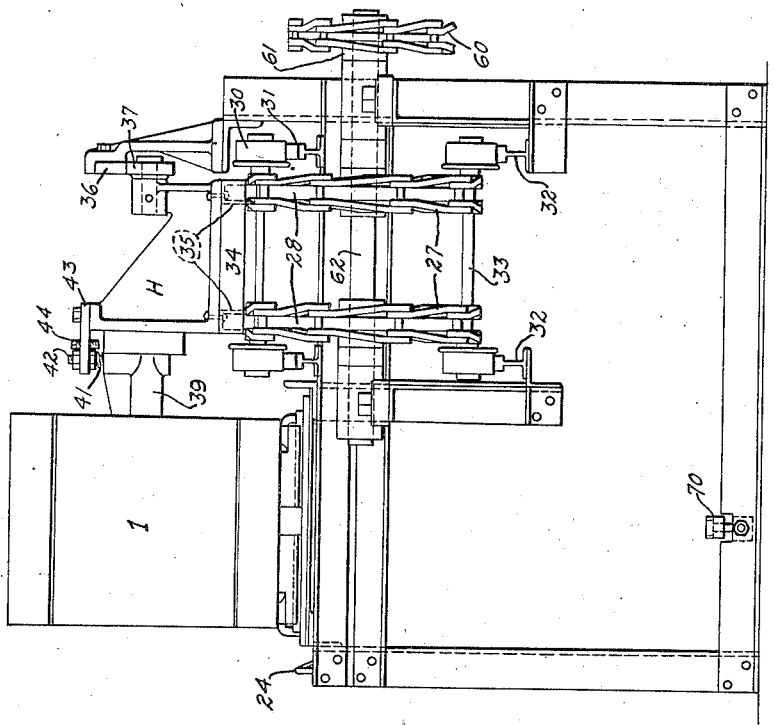
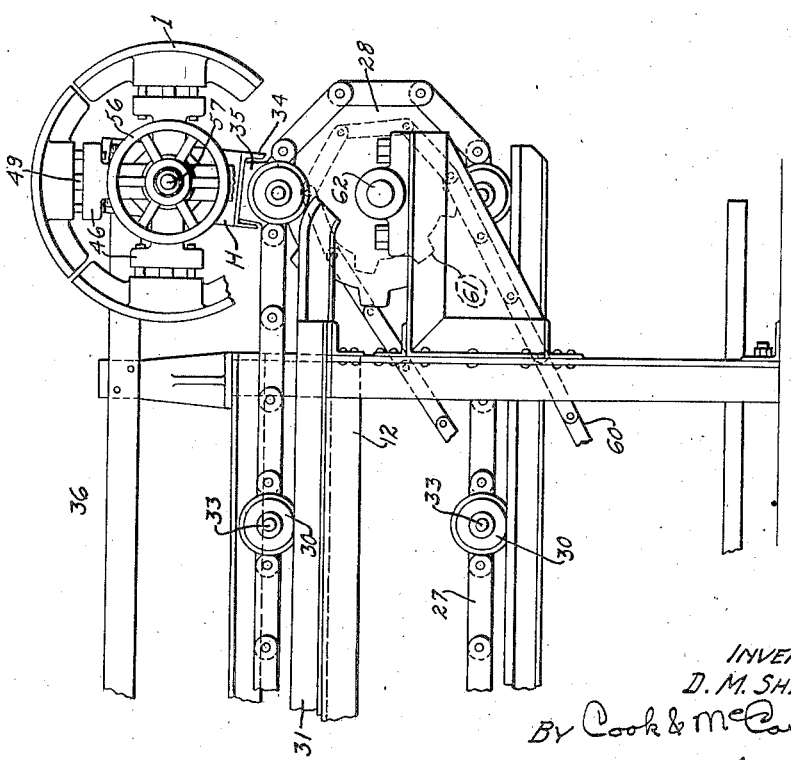
INVENTOR
D. M. SHELDON
By Cook & McCauley
ATTORNEYS May 21, 1929.  D. M. SHELDON  1,713,927
METHOD OF AND APPARATUS FOR MAKING TIRES
Filed March 12, 1926  7 Sheets-Sheet 4
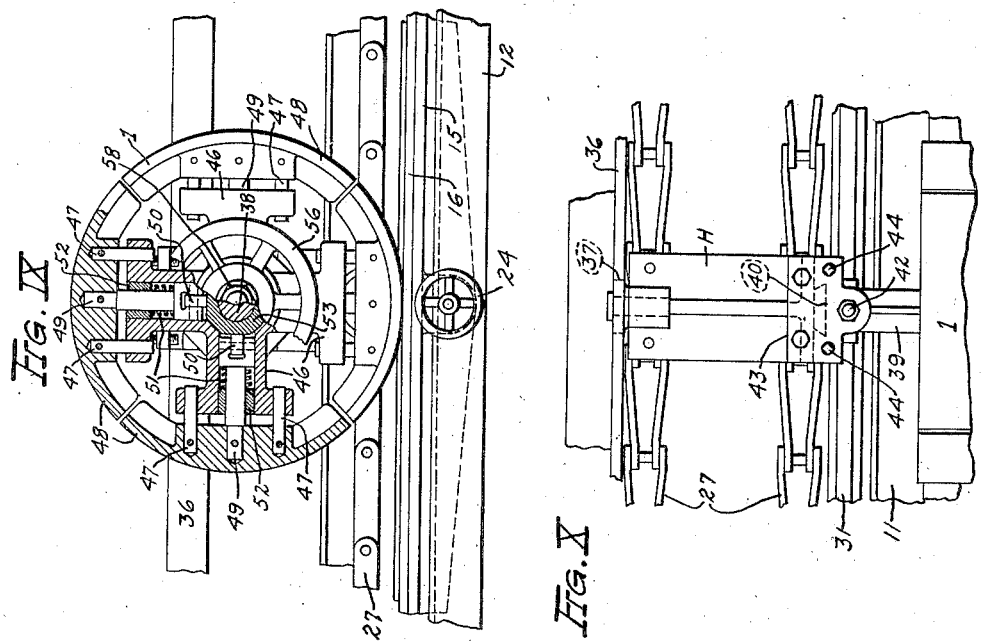
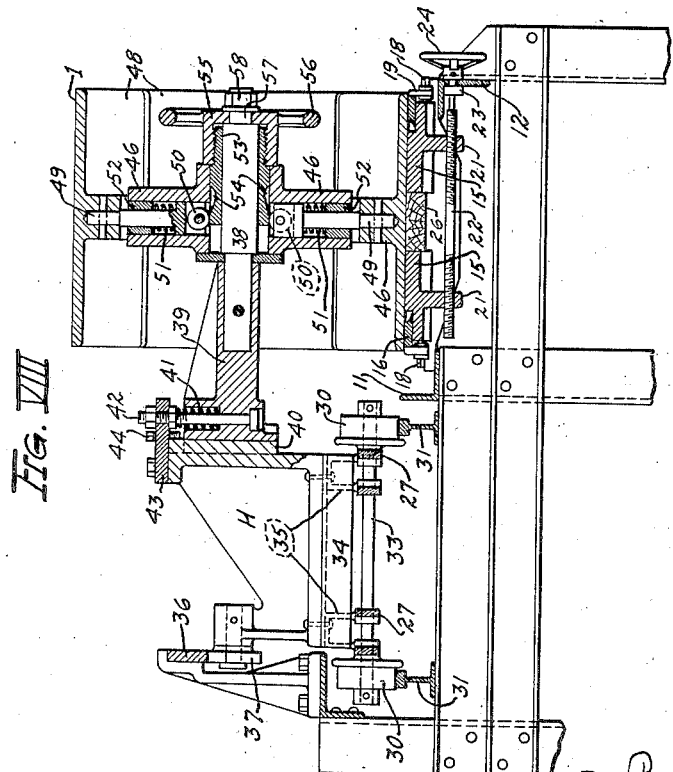
INVENTOR
D. M. SHELDON
By Cook & McCauley
ATTORNEYS

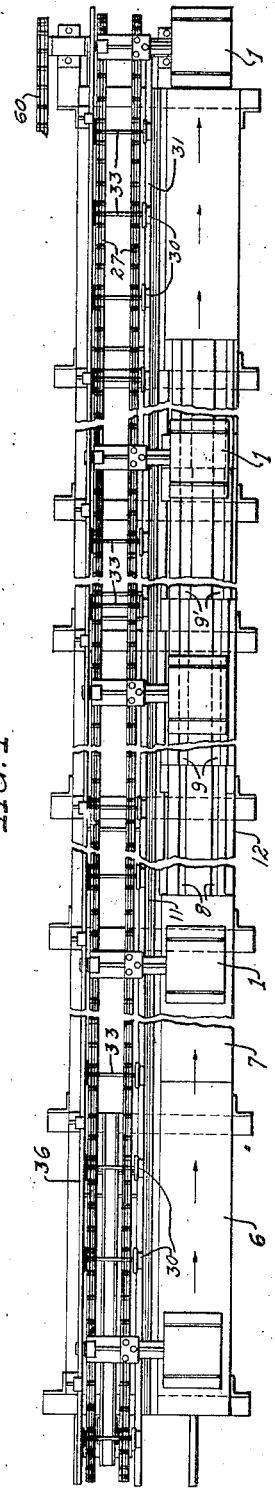

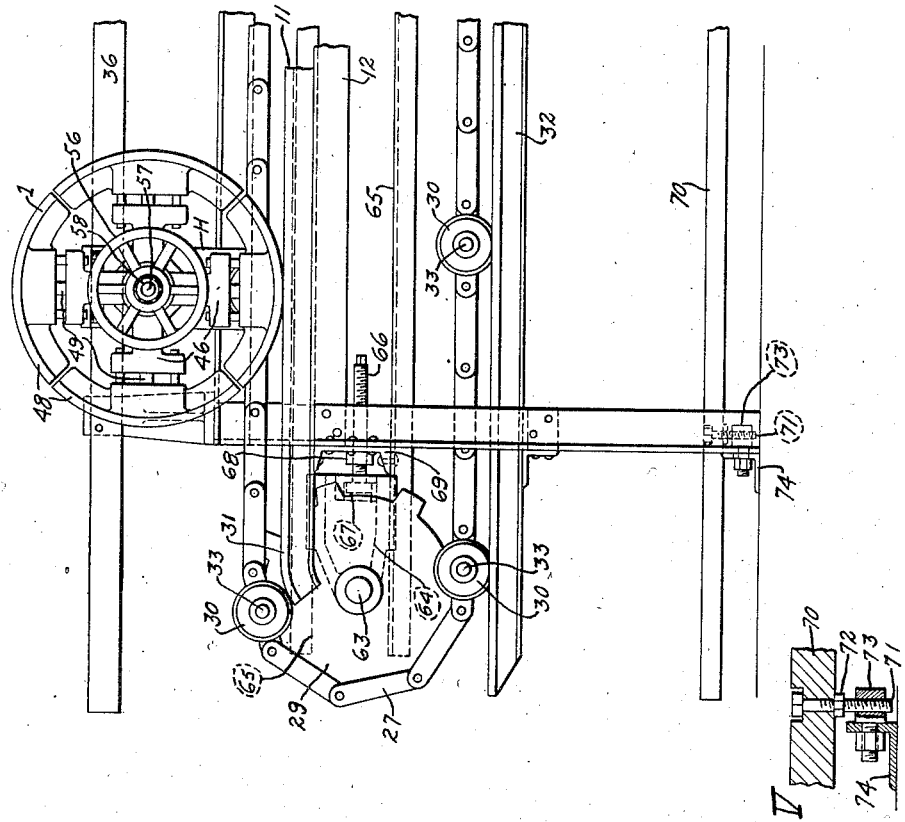

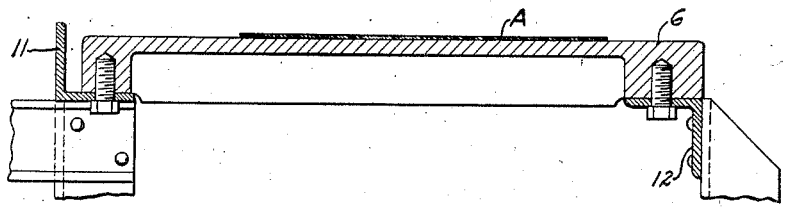
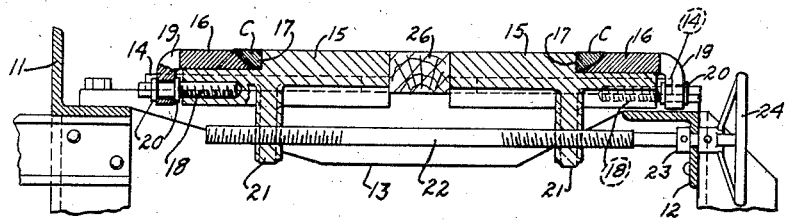
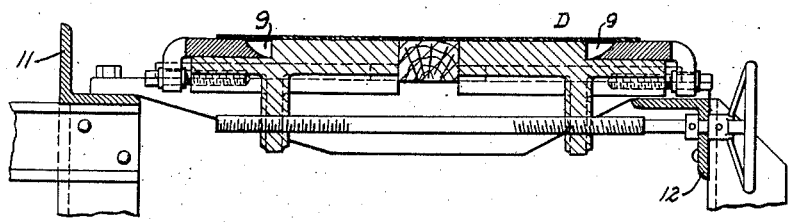
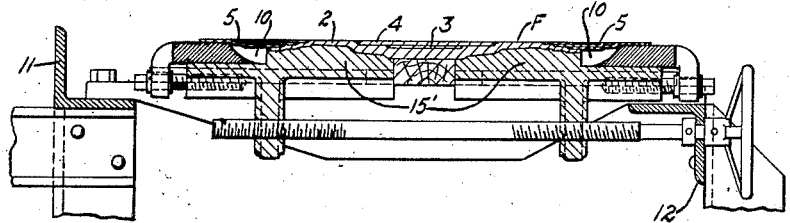

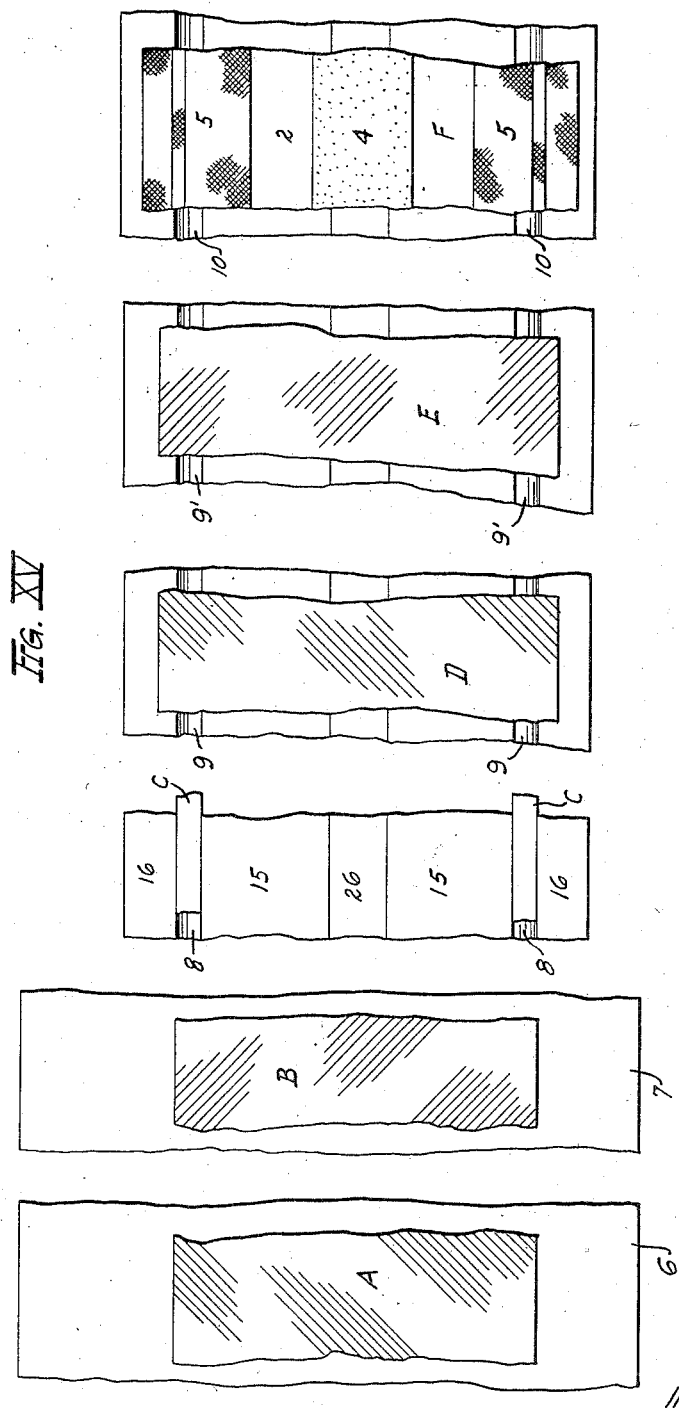

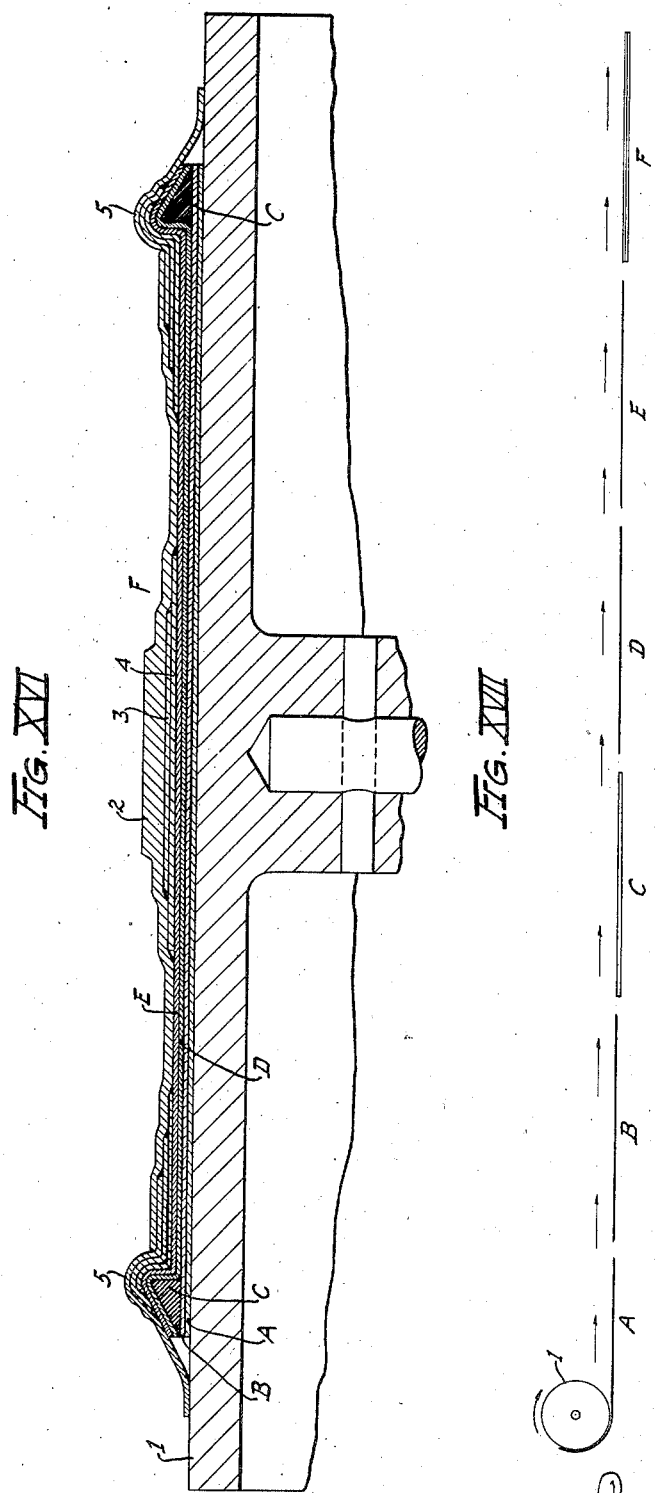

Patented May 21, 1929.

1,713,927

UNITED STATES PATENT OFFICE.

DWIGHT M. SHELDON, OF WEBSTER GROVES, MISSOURI, ASSIGNOR TO CUPPLES COMPANY, MANUFACTURERS, OF ST. LOUIS, MISSOURI, A CORPORATION OF MISSOURI.

METHOD OF AND APPARATUS FOR MAKING TIRES.

Application filed March 12, 1926. Serial No. 94,148.

This invention relates to methods of and apparatus for making tires, the main objects being to simplify and reduce the cost of tire manufacture, and to accurately locate the elements of a tire at predetermined positions in the tire structure. The invention is especially adapted for the manufacture of tires that can be built up by winding strips of tire-forming material around a drum or other rotary member.

A further object is to assemble various elements of a tire structure by merely rotating a drum, or the like, over a support on which the strips are arranged for delivery to the drum. The rotating drum preferably travels lengthwise of the strip, and it can be rolled over a series of strips arranged on a suitable support, so as to successively wind the strips around the drum, thereby assembling the elements of a tire casing in a very simple operation. For example, strips of fabric, bead-forming strips and a tread strip can be accurately arranged in a long straight row, and by merely rolling the drum over this row, the successive strips will be accurately assembled to form a tire structure around the drum.

With the foregoing and other objects in view, the invention comprises the novel method and apparatus herein described to set forth one form of the invention, and it is to be understood that the invention comprehends all modifications and variations within the scope of the claims hereunto appended.

Fig. I is a top view of an apparatus embodying the features of this invention, portions of the structure being broken away to shorten the view.

Fig. II is a side elevation of the apparatus shown in Fig. I.

Fig. III is an end view of the apparatus on a larger scale.

Fig. IV is a side elevation of the end portion shown in Fig. III.

Fig. V is a section on the line V—V in Fig. III, showing an adjustable support.

Fig. VI is a side elevation of the other end portion of the apparatus, portions of the drum being broken away.

Fig. VII is an end view of the structure shown in Fig. VI.

Fig. VIII is a vertical section showing one of the drums and the traveling carriage whereby the drum is rolled over the long table which supports the strips of material.

Fig. IX is a side elevation, partly in section, showing elements which appear at the upper portion of Fig. VIII.

Fig. X is a fragmentary top view showing a portion of one of the drums and the traveling carriage to which it is secured.

Fig. XI is a transverse section on a larger scale showing the station at which the first ply of fabric is supported.

Fig. XII is a view similar to Fig. XI showing the station at which the bead-forming strips are supported.

Fig. XIII is a similar view showing the station at which the third ply of fabric is supported.

Fig. XIV is a similar view showing the last station which supports the tread-forming elements.

Fig. XV is a diagrammatical top view illustrating portions of each of the successive stations with portions of the strips of material at the several stations.

Fig. XVI is an enlarged section showing the peripheral portion of one of the drums and the tire structure formed by winding the strips of material around the drum.

Fig. XVII is a diagrammatical view showing one of the rotary drums and a row of the strips over which the drum is rolled to form the tire structure.

1 designates the drums secured to a suitable traveling carrier, as will be hereafter pointed out. Before describing the various mechanical details, the simple diagram (Fig. XVII) will be referred to in a brief general description of the successive operations whereby the several strips are assembled to form the tire structure shown in Fig. XVI.

A designates a strip of fabric, preferably cord fabric, adapted to form the first ply, or inner ply. B designates a strip of cord fabric to form the second ply, and C the bead centers to be located near the margins of the structure. The third and fourth plies of cord fabric are designated D and E, respectively, and the tread strip F comprises (Fig. XVI) the rubber tread stock 2, a breaker strip 3, a cushion strip of gum 4, and the three-ply wearing strips, or chafing strips, 5 adhering to the side margins of the tread stock 2. The fabric strips are rubberized, and the other strips are made of raw, or partly cured, rubber stock, so the several strips have adhesive surfaces.

The strips are arranged in a straight row, as suggested by Fig. XVII, and the tread strip F at one end of this row may include the several elements 2, 3, 4 and 5. The drum 1 is rolled over the row of strips with the result of winding them around the drum to form the structure shown in cross section by Fig. XVI. The structure is then removed from the drum and vulcanized in any suitable manner to produce the finished tire casing.

Fig. XV is a fragmentary top view showing portions of each strip, and portions of the supporting elements at the several stations. Before proceeding with the description of the details, each station will be briefly referred to. The supporting element at the first station is shown in Fig. XI and at the lefthand end of Fig. I, also at the left of Fig. XV. This supporting element is an elongated table member 6 having a flat top surface to receive the first ply A. The next station includes a similar table member 7 having a flat top surface to receive the second ply B. The third station has a flat top surface provided with longitudinal grooves, or recesses, 8 to receive the bead-forming strips C, as shown in Figs. I, XII and XV. The fourth station has a flat top surface to receive the third ply D, and this surface is provided with grooves 9 to receive the annular ribs which are formed around the drum after the bead elements C have been wound on the drum. The elements of this fourth station are shown in Fig. XIII. The fifth station is almost identical with the fourth, and it has grooves 9' (Fig. XV), preferably slightly wider than the grooves 9. The last station receives the tread strip F, as shown by Figs. XIV and XV, the top surface of the supporting means at this station being irregular to conform to the shape of the bottom of the tread strip F, as shown in Fig. XIV. This station also has longitudinal grooves 10 slightly wider than the grooves 9'. Fig. XV shows that the grooves 8, 9, 9' and 10 are in alinement with each other.

The frame of the apparatus includes angle bars 11 and 12 which appear in Figs. XI to XIV, inclusive, and these angle bars extend approximately from end to end of the apparatus, as shown by Figs. I and II. The table members at the several stations rest upon the angle bars 11 and 12. Fig. XI shows the table member 6 secured to the angle bars by means of screws, and the table 7 at the second station may be identical with the table 6. The third station, shown in Fig. XII, includes adjusting means to vary the width and locations of the recesses which receive the bead-forming elements C. At this station transverse supporting members 13 extend from the bar 11 to the bar 12, and they are secured to said bars to form stationary supports for the adjustable elements. As shown by Figs. II and XII, the transverse members 13 are provided with horizontal ribs 14 on their top faces. Longitudinal bars 15 are recessed at the bottom to receive the ribs 14, the latter serving as guides which allow the bars 15 to be adjusted toward and away from each other. The outer side margins of the bars 15 are recessed, as shown in Fig. XII, to receive bars 16 which cooperate with the bars 15 to form the longitudinal recesses in which the bead elements C are located. To vary the widths of these longitudinal recesses, the bars 16 can be adjusted toward and away from the shoulders 17 on the bars 15.

The adjusting means comprises screws 18 (Fig. XII), each screw being rotatably mounted in a member 19 extending from a bar 16, and provided with collars 20 at opposite sides of said member. The screws 18 can be rotated in opposite directions to move the bars 16 toward and away from the shoulders 17, thereby varying the widths of the grooves which receive the bead-forming strips.

To change the locations of these grooves, the bars 15 can be adjusted toward and away from each other. Extensions 21, projecting downwardly from the bars 15, are threaded to receive a rod 22 having righthand threads in one of these extensions and lefthand threads in the other extension 21. This rod 22 is rotatably mounted in the angle bar 12 (Fig. XII) and it is provided with a collar 23 engaging the inner face of said angle bar and a wheel 24 engaging the outer face of said bar. Obviously, the wheel 24 can be rotated by hand to move the bars 15 toward and away from each other, and after the desired adjustment has been obtained the space between the bars is filled by a member 26. Fig. XII shows that the horizontal top faces of the members 15, 16 and 26 are flush with each other, and that the bead elements C can project a slight distance above these horizontal faces to insure the desired contact when the elements C are wound onto the drum.

Fig. XIII is a view similar to Fig. XII, and it is intended to show the adjustable supporting means used at the fourth and fifth stations where the fabric strips D and E are supported. By referring to Fig. XIII it will be seen that the supporting elements are substantially identical with the elements shown in Fig. XII, so it seems unnecessary to point out the details of the adjustable supporting device in Fig. XIII.

Fig. XIV is a view similar to Fig. XII, showing the adjustable supporting elements at the last station where the tread strip F is mounted. The top surfaces of the bars 15' at this station are shaped to conform to the tread element, but the adjustable supporting elements are otherwise the same as those shown in Fig. XII.

To illustrate a suitable means for rotating the drums 1 I have shown an endless carrier comprising a pair of endless sprocket chains 27 (Figs. I and II) passing around sprocket wheels 28 at one end of the machine, as shown in Figs. VI and VII, and also at the righthand end of Fig. II. At the other end of the machine the endless chains pass around sprocket wheels 29. To support and guide the chains they are provided with rollers 30 adapted to travel on stationary upper tracks 31 and also on lower tracks 32. The tracks are arranged horizontally to guide the chains in straight horizontal lines. The rollers 30 are mounted on the ends of rods 33 which extend through the chains.

As shown by Fig. II, the apparatus may be provided with a series of the drums 1, and each drum is yieldingly secured to the endless carrier as shown most clearly by Figs. VIII, IX and X. The means for connecting the drums to the endless carrier comprises a series of brackets H, one for each drum, each of these brackets having a channel-shaped lower portion 34 (Figs. VI and VII) resting upon and secured to members 35 which extend from some of the links of the sprocket chains. Each bracket H is thus rigidly secured to the chains. A stationary guide bar 36 is located adjacent to the course of the brackets H, and each bracket is provided with a wheel 37 adapted to engage the lower edge of this bar. Each drum 1 is rotatably mounted on a spindle 38 (Fig. VIII) extending from an arm 39, each arm having a groove at one end to receive a dovetail rib 40 formed on the adjacent bracket H, as shown in Figs. VIII and X. The arm 39 can therefore move vertically relative to the traveling carrier, and the drum may be supported by the table over which it is rolled to receive the tire-forming material. Fig. VIII shows a spring 41 arranged to yieldingly force the drum toward the table. A bolt 42 extends through this spring and also through one end of the arm 39, the upper end of the bolt being secured to a plate 43 secured to the bracket H, and the lower end of said bolt being provided with a head to limit the vertical movement of the arm 39. Adjustable stop screws 44 (Figs. VIII and X) are located above the arm 39.

It will now be understood that each drum 1 is yieldingly secured to the traveling carrier so that the weight of the drum is supported on the tire-forming strips, and the drum is permitted to rise in response to the increasing diameter resulting from the operations of winding the several strips around the drum. It will also be noted that the drum is rotated in response to its contact with the strips of material while the traveling carrier is moving in a straight line, and that it is not necessary to employ rotary driving mechanism at the drum. In other words, the drums may be merely rolled over the strips of material.

After the tire structure has been formed by winding the several strips, the drum on which the strips are wound can be contracted to permit removal of the tire structure. The means for contracting a drum is shown most clearly in Figs. VIII and IX. Each drum comprises hollow spokes 46 provided with lugs at their outer ends to receive pins 47 extending from segments 48 which form the periphery of the drum. Each segment 48 is provided with a central pin 49 extending into a hollow spoke 46 and having a roller 50 at its inner end. This inner end is enlarged to receive the roller, and a spring 51 is interposed between the enlarged inner end and a plug 52 at the outer end of the hollow spoke. The springs 51 tend to force the segments 48 inwardly, but this inward motion is limited by the rollers 50 engaging a sleeve 53 which is slidably mounted on the spindle 38, as shown in Figs. VIII and IX. This sleeve 53 has flat outer faces engaged by the rollers 50, as shown in Fig. IX, and it also has grooves 54 shown in Fig. VIII. The sleeve 53 can be moved longitudinally of the spindle 38 to permit the springs 51 to force the rollers 50 into the grooves 54, thereby contracting the drum. The means for imparting a longitudinal motion to the sleeve 52 so as to contract the drum is shown most clearly in Fig. VIII. It comprises a cap 55 screwed onto one end of the sleeve 54 and provided with an operating wheel 56. The spindle 38 has a reduced end 57 extending through the cap 55 and a nut 58 on the end of 57 prevents longitudinal displacement of the cap 55, but does not prevent rotary motion of said cap. To contract the drum the wheel 56 is rotated, thereby turning the cap 55 to move the sleeve 53 to the left from the position shown in Fig. VIII, thereby permitting the rollers 50 to enter the grooves 54. After the tire structure is removed the wheel 56 is operated to expand the drum to its normal condition. It will be noted that only one side of the drum is attached to the traveling carrier, the opposite side being free of connections that would prevent removal of the tire structure.

The series of drums 1 travel in an endless course around the elongated table, as suggested by Fig. II, and each drum gathers a set of the strips to form the desired tire structure around its periphery. The drums are separated some distance from each other, so that one drum will pass from a given station before another drum enters the same station. The operators place the strips of material at the different stations, and just as soon as a strip has been removed by a drum, another strip can be placed on the table to be picked up by the next drum. When a drum reaches the righthand end of the apparatus shown in Fig. II it is contracted to release the tire structure, which is then removed from the drum and transmitted to a suitable forming and vulcanizing apparatus.

The means for driving the endless conveyor comprises a sprocket chain 60 (Figs. I, VI and VII) fitted to a sprocket wheel 61 on the shaft 62 to which the sprocket wheels 28 are secured. The sprocket wheels 29 at the opposite end of the machine (Figs. III and IV) are secured to a shaft 63 mounted in a bearing 64 slidably mounted between stationary channel bars 65. An adjusting screw 66 is provided with a head 67 (Fig. IV) rotatably mounted in the bearing 64, and this screw passes through a nut member 68 rigidly secured to a stationary channel bar 69. Obviously, the screw 66 can be adjusted to shift the bearing 64 and thereby tighten the sprocket chains 27.

A supporting bar or track 70 is located under the long table, as shown in Fig. II, to support the drums 1. This bar, or track, 70 is adjustably supported by devices shown in Figs. III, IV, V and VII. A vertical screw 71 is rotatably mounted in the bar 70 (Fig. V), the screw having a head located in a recess at the top of the bar and a nut 72 engaging the bottom of the bar. A stationary block 73 is rigidly secured to an angle bar 74, and this block is threaded to receive the screw 71 so the latter may be rotated to adjust the bar 70.

I claim:

1. The method of making tires which comprises arranging strips of fabric and bead-forming strips in a substantially flat condition and in a row with the bead-forming strips between and in longitudinal alinement with the locations of fabric strips, and rolling a member over said row, from one strip to another, so as to successively wind the strips around said member.

2. The method of uniting the fabric plies and the bead and tread elements of a tire, said method comprising arranging fabric strips, bead-forming strips and a tread strip in a substantially flat condition and in a row with a fabric strip at the beginning of the row, the tread strip at the end of the row, and bead-forming strips between and in longitudinal alinement with the locations of fabric strips, and rolling a member over said row to successively wind the several strips around said rolling member.

3. The method of uniting the fabric plies and the bead and tread elements of a tire, said method comprising arranging fabric strips, bead-forming strips and a tread strip in a substantially flat condition and in a row with a fabric strip at the beginning of the row, the tread strip at the end of the row, and bead-forming strips between fabric strips, and rolling a drum over said row to successively wind the strips around said drum.

4. The method of making tires which comprises moving a series of drums in an endless course over and then under a support having substantially flat top faces, arranging in a flat condition on said flat faces a set of tire-forming strips for each drum, and rolling each drum over a set of the tire-forming strips to form a tire structure on each drum.

5. The method of making tires which comprises arranging the elements of a tire casing in a substantially straight and flat condition at different stations with an inner ply strip at the first station, a tread strip at the last station and bead-forming strips at an intermediate station, and rolling a drum over the strips at the several stations to wind the strips around the periphery of the drum.

6. In a tire-making apparatus, successive stations having substantially flat surfaces adapted to receive fabric strips, bead-forming strips and a tread strip, a drum adapted to receive said strips to form a tire structure around the drum, said drum being movable from one station to another to receive the strips, means whereby said drum is rolled over the strips at each station to wind the strips around the drum, and means for guiding the rolling drum in a direction lengthwise of the strips.

7. In a tire-making apparatus, a support having recesses to receive bead-forming strips, a rotatable member on which elements of the tire structure are united, and means whereby said rotatable member is rolled over said recesses to wind the bead-forming strips around said member.

8. In a tire-making apparatus, a supporting device having surfaces to receive fabric strips and recesses to receive bead-forming strips, a rotatable member on which elements of the tire structure are united, and means whereby said rotatable member is rolled along said supporting device to successively wind said strips around said member.

9. In a tire-making apparatus, a supporting device having surfaces to receive fabric strips, recesses to receive bead-forming strips and a surface to receive a tread-strip, a rotatable drum on which elements of the tire structure are united, and means whereby said drum is rolled over said surfaces and over said recesses to successively wind the strips around the drum.

10. In a tire-making apparatus, supporting means adapted to receive strips of tire-forming material, a carrier adapted to travel near said supporting means, a member rotatably secured to said carrier and adapted to roll over and contact with said strips, and means whereby said carrier is actuated to roll said rotatable member over said supporting means and to thereby wind the strips onto said rotatable member.

11. In a tire-making apparatus, supporting means adapted to receive strips of tire-forming material, a rotary member adapted to receive said strips, and driving means whereby said member is rolled along said supporting means to successively wind the strips around said member, said driving means including a traveling carrier to which said member is yieldingly secured.

12. In a tire-making apparatus, supporting means adapted to receive strips of tire-forming material, a rotary member adapted to receive said strips, and driving means whereby said member is rolled along said supporting means to successively wind the strips around said member, said driving means including a traveling carrier, a guide for said carrier, and a yieldable device connecting said rotary member to said carrier.

13. In a tire-making apparatus, a supporting device having surfaces to receive fabric strips, recesses to receive bead-forming strips and a surface to receive a tread-strip, a rotatable drum on which elements of the tire structure are united, and means whereby said drum is rolled over said surfaces and over said recesses to successively wind the strips around the drum, said means including a traveling carrier, a track whereby said carrier is guided, and a yieldable device whereby said drum is secured to said carrier to provide for irregularities in the course of the drum.

14. In a tire-making apparatus, supporting means adapted to receive strips of tire-forming material, a rotary member adapted to receive said strips, and driving means whereby said member is rolled along said supporting means to successively wind the strips around said member, said driving means including a traveling carrier at one side of said rotary member, and the other side of said rotary member being spaced from said driving means to permit removal of the tire structure.

15. In a tire-making apparatus, a supporting device having surfaces to receive fabric strips, recesses to receive bead-forming strips and a surface to receive a tread-strip, a rotatable drum on which elements of the tire structure are united, and means whereby said drum is rolled over said surfaces and over said recesses to successively wind the strips around the drum, said means being located at one side of the drum, the other side being spaced from the driving means to permit removal of the tire structure, and said drum being contractible to release the tire structure.

16. In a tire-making apparatus, a supporting device adapted to receive strips of tire-forming material, a rotatable drum adapted to receive the strips, and means whereby said drum is carried in an endless course surrounding said supporting device, said drum being rolled over said supporting device to wind the strips around the drum.

17. In a tire-making apparatus, a supporting device adapted to receive strips of tire-forming material, a rotatable drum adapted to receive the strips, and means whereby said drum is carried in an endless course surrounding said supporting device, said means comprising an endless flexible carrier connected to said rotatable drum so as to roll the drum over said supporting device to wind the strips of material around the drum.

18. In a tire-making apparatus, a support comprising members provided with recesses to receive bead-forming strips, one of said members being adjustable to vary the distance between the bead-forming strips, a rotatable member on which elements of the tire structure are united, and means whereby said rotatable member is rotated over said recesses to wind the bead-forming strips around said rotatable member.

19. In a tire-making apparatus, a support comprising members separated from each other to provide recesses for bead-forming strips, one of said members being adjustable transversely to vary the width of the recess between it and the adjacent member, a rotatable member on which elements of the tire structure are united, and means whereby said rotatable member is rotated over said recesses to wind the bead-forming strips around the rotatable member.

20. In a tire-making apparatus, a support comprising members provided with recesses to receive bead-forming strips, said members being adjustable toward and away from each other to vary the distance between the bead-forming strips, each recess having an adjustable wall to vary the width of the recess, a rotatable member on which elements of the tire structure are united, and means whereby said rotatable member is rotated over said recesses to wind the bead-forming strips around said rotatable member.

In testimony that I claim the foregoing I hereunto affix my signature.

DWIGHT M. SHELDON.